(12) United States Patent
Fujii et al.

(10) Patent No.: US 11,581,142 B2
(45) Date of Patent: Feb. 14, 2023

(54) MULTILAYER ELECTRONIC COMPONENT AND METHOD FOR MANUFACTURING MULTILAYER ELECTRONIC COMPONENT

(71) Applicant: Murata Manufacturing Co., Ltd., Nagaokakyo (JP)

(72) Inventors: Hisashi Fujii, Nagaokakyo (JP); Yoshito Saito, Nagaokakyo (JP); Masaki Masuda, Nagaokakyo (JP); Hidekazu Tamura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 209 days.

(21) Appl. No.: 16/987,427

(22) Filed: Aug. 7, 2020

(65) Prior Publication Data
US 2021/0065978 A1  Mar. 4, 2021

(30) Foreign Application Priority Data
Aug. 28, 2019  (JP) .............................. JP2019-155183

(51) Int. Cl.
*H01G 4/30* (2006.01)
*H01G 4/12* (2006.01)
*H01G 4/005* (2006.01)
*C04B 35/468* (2006.01)
*C04B 35/626* (2006.01)
*C04B 35/64* (2006.01)

(52) U.S. Cl.
CPC ....... *H01G 4/1218* (2013.01); *C04B 35/4682* (2013.01); *C04B 35/62675* (2013.01); *C04B 35/64* (2013.01); *H01G 4/005* (2013.01); *H01G 4/30* (2013.01); *C04B 2235/5445* (2013.01); *C04B 2235/65* (2013.01)

(58) Field of Classification Search
CPC ...... C04B 35/4682; H01G 4/005; H01G 4/30; H01G 4/1218
USPC ............... 361/303, 311, 312, 321.4; 501/137
See application file for complete search history.

(56) References Cited

U.S. PATENT DOCUMENTS

| | | | | |
|---|---|---|---|---|
| 2009/0202426 A1* | 8/2009 | Yamashita | ........ | C04B 35/62675 423/598 |
| 2010/0092375 A1* | 4/2010 | Fukazawa | ......... | C04B 35/62675 423/598 |
| 2016/0137523 A1 | 5/2016 | Ajichi et al. | | |

FOREIGN PATENT DOCUMENTS

| | | | | |
|---|---|---|---|---|
| JP | 2016-094324 A | 5/2016 | | |
| WO | WO-2009125681 A2 * | 10/2009 | ............. | B82Y 30/00 |
| WO | WO-2016163330 A1 * | 10/2016 | ............. | C01G 23/00 |

* cited by examiner

*Primary Examiner* — Arun Ramaswamy
(74) *Attorney, Agent, or Firm* — Keating & Bennett, LLP

(57) ABSTRACT

A multilayer electronic component includes a multilayer body including dielectric layers and inner electrode layers, the multilayer body including an electrode facing portion in which the inner electrode layers are laminated to face each other with the dielectric layers interposed therebetween. The multilayer body has a thickness of at least about 1.5 mm in a lamination direction, a length of at least about 3.0 mm, and a width of at least about 1.5 mm. Each of the dielectric layers includes Ba, Ti, and Cl. A Cl concentration $C_1$ in the entire electrode facing portion satisfies about 10 wtppm<$C_1$<about 50 wtppm. On an imaginary central axis line, a Cl concentration $C_2$ in a central portion of the electrode facing portion and a Cl concentration $C_3$ in both end portions of the electrode facing portion satisfy about $0.5C_2 \leq C_3 < C_2$.

19 Claims, 6 Drawing Sheets

MULTILAYER ELECTRONIC COMPONENT AND METHOD FOR MANUFACTURING MULTILAYER ELECTRONIC COMPONENT

CROSS REFERENCE TO RELATED APPLICATIONS

This application claims the benefit of priority to Japanese Patent Application No. 2019-155183 filed on Aug. 28, 2019. The entire contents of this application are hereby incorporated herein by reference.

BACKGROUND OF THE INVENTION

1. Field of the Invention

The present invention relates to a multilayer electronic component.

2. Description of the Related Art

A multilayer ceramic capacitor, which is a representative multilayer electronic component, includes a multilayer body including a plurality of laminated dielectric layers and a plurality of inner electrode layers. Such a multilayer body is often manufactured using dielectric raw material powder including $BaTiO_3$ powder and various additives. The $BaTiO_3$ powder can be obtained by a solid phase synthesis method, a hydrothermal synthesis method, an oxalic acid method, and the like.

For the raw material used for the manufacturing of the $BaTiO_3$ powder, a Cl compound or a compound including Cl may be used. The $BaTiO_3$ powder manufactured using such a raw material includes Cl originating from the raw material. When the concentration of Cl included in the $BaTiO_3$ powder becomes high, the concentration of Cl remaining in the multilayer body after calcination also becomes high. In this case, reliability of the multilayer ceramic capacitor may be decreased, i.e., a high-temperature load life may become short.

To address this, efforts have been made to reduce the Cl concentration in the multilayer body. For example, Japanese Patent Laid-Open No. 2016-94324 discloses a technique for obtaining $BaTiO_3$ powder by which a highly reliable multilayer ceramic capacitor can be manufactured by providing a Cl removing step in the solid phase synthesis method.

However, Japanese Patent Laid-Open No. 2016-94324 does not disclose the concentration and distribution of Cl in the multilayer body after calcination. The concentration and distribution of Cl in the multilayer body after calcination are directly associated with reliability of the multilayer ceramic capacitor.

SUMMARY OF THE INVENTION

Preferred embodiments of the present invention provide multilayer electronic components and methods for manufacturing multilayer electronic components to obtain high reliability with attention being directed to concentration and distribution of Cl in the multilayer body after calcination.

A multilayer electronic component according to a preferred embodiment of the present invention includes a multilayer body including a plurality of dielectric layers and a plurality of inner electrode layers, the multilayer body including an electrode facing portion in which the plurality of inner electrode layers face each other with the dielectric layers interposed therebetween. The multilayer body has a thickness of more than or equal to about 1.5 mm in a lamination direction. The multilayer body has a length of more than or equal to about 3.0 mm, the length being orthogonal or substantially orthogonal to the lamination direction. The multilayer body has a width of more than or equal to about 1.5 mm, the width being orthogonal or substantially orthogonal to the lamination direction and a length direction.

Each of the dielectric layers includes Ba, Ti, and Cl. A Cl concentration $C_1$ in the entire electrode facing portion satisfies about 10 wtppm $\leq C_1 \leq$ about 50 wtppm. On an imaginary central axis line of the electrode facing portion when seen in a plan view in the lamination direction, a Cl concentration $C_2$ in a central portion of the electrode facing portion and a Cl concentration $C_3$ in both end portions of the electrode facing portion satisfy about $0.5C_2 < C_3 < C_2$.

A method for manufacturing a multilayer electronic component according to a preferred embodiment of the present invention includes obtaining a plurality of pre-sintering dielectric layers using dielectric powder including Ba, Ti and Cl, forming pre-sintering inner electrode layers on pre-sintering dielectric layers of the plurality of pre-sintering dielectric layers, obtaining a pre-sintering multilayer body by laminating the plurality of pre-sintering dielectric layers including the pre-sintering dielectric layers on which the pre-sintering inner electrode layers are formed, and obtaining a multilayer body including a plurality of laminated dielectric layers and a plurality of inner electrode layers by sintering the pre-sintering multilayer body at a first temperature.

The obtaining of the multilayer body includes at least one of: holding for more than or equal to about 0.5 hour at a second temperature; and increasing a temperature from the second temperature to the first temperature at a temperature increasing rate that is less than or equal to about half of a temperature increasing rate of increasing the temperature from a third temperature to the second temperature. The second temperature is a temperature lower than the first temperature by about 50° C. to about 250° C. The third temperature is a temperature lower than the second temperature by about 150° C. to about 350° C.

The multilayer electronic components according to preferred embodiments of the present invention are each able to achieve high reliability. Moreover, by the methods for manufacturing multilayer electronic components according to preferred embodiments of the present invention, multilayer electronic components each having high reliability are able to be manufactured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
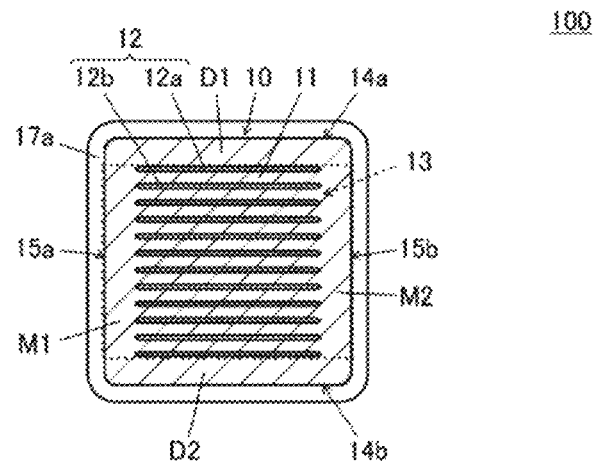
FIG. 1A is a cross sectional view of a central portion of a multilayer ceramic capacitor 100 in a length direction, multilayer ceramic capacitor 100 being an example of a multilayer electronic component according to a preferred embodiment of the present invention.

Preferred embodiments of the present invention will be described with reference to the drawings. In each of below-described preferred embodiments of a multilayer electronic component, the same or common portions are denoted by the same reference characters in the drawings and may not be described repeatedly.

Preferred Embodiment of Multilayer Electronic Component

With reference to FIG. 1A to FIG. 7, the following describes a multilayer ceramic capacitor 100 according to a preferred embodiment of a multilayer electronic component according to the present invention.

Structure of Multilayer Ceramic Capacitor

Figure 1B:
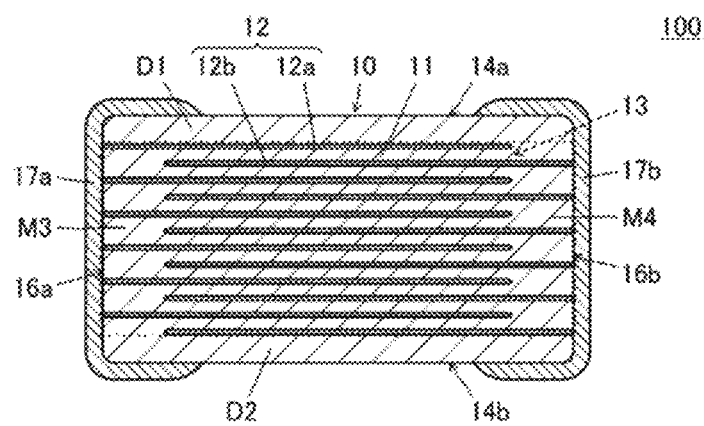
FIG. 1B is a cross sectional view of a central portion of multilayer ceramic capacitor 100 in a width direction.

The following describes a structure of multilayer ceramic capacitor 100. Each of FIGS. 1A and 1B is a cross sectional view of multilayer ceramic capacitor 100. Multilayer ceramic capacitor 100 includes a multilayer body 10. Multilayer body 10 includes a plurality of laminated dielectric layers 11 and a plurality of inner electrode layers 12.

Each of dielectric layers 11 preferably includes Ba, Ti, and Cl, for example. Dielectric layer 11 preferably includes, for example, a plurality of crystal grains including a perovskite compound including $BaTiO_3$.

Cl included in dielectric layer 11 basically originates from Cl included in $BaTiO_3$ powder of a dielectric raw material as described above. However, for example, when a dummy chip is disposed in surroundings during calcination, Cl gas from the dummy chip may be absorbed in the dielectric layer that has not been sintered yet. Such Cl absorbed from the atmosphere during the calcination can be also included in sintered dielectric layer 11.

As a conductive material for inner electrode layer 12, it is possible to use, for example, at least one metal selected from Ni, a Ni alloy, Cu, and a Cu alloy, or an alloy including the metal. Inner electrode layer 12 may further include dielectric particles, which are referred to as "coexisting material". The coexisting material is added upon calcining multilayer body 10 in order to provide inner electrode layer 12 with a sintering contraction characteristic close to that of dielectric layer 11. Any coexisting material may be used as long as such an advantageous effect is provided.

Multilayer body 10 includes a first main surface 14a, a second main surface 14b, a first side surface 15a, a second side surface 15b, a first end surface 16a, and a second end surface 16b. First main surface 14a and second main surface 14b face each other in a lamination direction. First side surface 15a and second side surface 15b face each other in a width direction orthogonal or substantially orthogonal to the lamination direction. First end surface 16a and second end surface 16b face each other in a length direction orthogonal or substantially orthogonal to the lamination direction and the width direction.

Multilayer body 10 has a rectangular or substantially rectangular parallelepiped shape surrounded by the above-described main surfaces and side surfaces. Multilayer body 10 preferably has a thickness of, for example, more than or equal to about 1.5 mm in the lamination direction. Multilayer body 10 preferably has a length of, for example, more than or equal to about 3.0 mm, the length being orthogonal or substantially orthogonal to the lamination direction. Multilayer body 10 preferably has a width of, for example, more than or equal to about 1.5 mm, the width being orthogonal or substantially orthogonal to the lamination direction and the length direction. It should be noted that corner portions and ridgeline portions of the rectangular or substantially rectangular parallelepiped may be rounded by way of barrel processing or the like.

That is, FIG. 1A is a cross sectional view of a central portion of multilayer ceramic capacitor 100 in the length direction. FIG. 1B is a cross sectional view of a central portion of multilayer ceramic capacitor 100 in the width direction.

The plurality of dielectric layers 11 include an outer layer portion and an inner layer portion. The outer layer portion includes a first outer layer portion D1 provided between first main surface 14a of multilayer body 10 and inner electrode layer 12 closest to first main surface 14a, and a second outer layer portion D2 provided between second main surface 14b and inner electrode layer 12 closest to second main surface 14b. The inner layer portion is disposed in a region interposed between first outer layer portion D1 and second outer layer portion D2. In the description below, each of dielectric layers 11 in the inner layer portion is simply referred to as "dielectric layer 11" unless otherwise stated particularly.

The plurality of inner electrode layers 12 include a first inner electrode layer 12a and a second inner electrode layer 12b. First inner electrode layer 12a includes a region that faces second inner electrode layer 12b with dielectric layer 11 being interposed therebetween, and a drawn region that extends to first end surface 16a of multilayer body 10. Second inner electrode layer 12b includes a region that faces first inner electrode layer 12a with dielectric layer 11 being interposed therebetween, and a drawn region that extends to second end surface 16b of multilayer body 10.

In multilayer body 10, a portion in which first and second inner electrode layers 12a, 12b and dielectric layers 11 are laminated is defined as an electrode facing portion 13 (portion surrounded by a dotted line in each of FIGS. 1A and 1B). That is, multilayer body 10 shown in FIGS. 1A and 1B includes electrode facing portion 13, first outer layer portion D1, and second outer layer portion D2.

One capacitor is defined by one first inner electrode layer 12a and one second inner electrode layer 12b facing each other with dielectric layer 11 being interposed therebetween. In multilayer ceramic capacitor 100, a plurality of capacitors included in electrode facing portion 13 are connected in parallel via a first outer electrode 17a and a second outer electrode 17b described below.

Multilayer ceramic capacitor 100 further includes first outer electrode 17a and second outer electrode 17b. First outer electrode 17a is provided on first end surface 16a so as to be electrically connected to first inner electrode layer 12a, and extends from first end surface 16a to first main surface 14a, second main surface 14b, first side surface 15a, and second side surface 15b. Second outer electrode 17b is provided on second end surface 16b so as to be electrically connected to second inner electrode layer 12b, and extends from second end surface 16b to first main surface 14a, second main surface 14b, first side surface 15a, and second side surface 15b.

Each of first outer electrode 17a and second outer electrode 17b includes an underlying electrode layer and a plating layer disposed on the underlying electrode layer. The underlying electrode layer includes at least one selected from a sintered body layer, an electrically conductive resin layer, a metal thin film layer, and a plating layer, for example.

The sintered body layer is obtained by baking a paste including metal powder and glass powder, and includes an electric conductor region and an oxide region. The electric conductor region includes a metal sintered body obtained by sintering the above-described metal powder. Examples of the metal powder include at least one metal selected from Ni, Cu, Ag, and the like, or an alloy including the metal. The oxide region includes a glass component originating from the above-described glass powder. Examples of the glass powder include $B_2O_3$—$SiO_2$—$BaO$-based glass material and the like, for example.

It should be noted that a plurality of sintered body layers having different components may be formed. Moreover, the sintered body layer may be calcined together with multilayer body 10, or may be baked after multilayer body 10 is calcined.

For example, the conductive resin layer includes, for example, conductive particles, such as metal fine particles, and a resin portion. Examples of a metal for the conductive particles include, for example, at least one metal selected from Ni, Cu, Ag, and the like, or an alloy including the metal. Examples of a resin for the resin portion include, for example, an epoxy-based thermosetting resin and the like. A plurality of conductive resin layers having different components may be provided.

The metal thin film layer is formed by a thin film forming method such as sputtering or vapor deposition, for example. The metal thin film layer preferably has a thickness of, for example, less than or equal to about 1 μm and includes the metal fine particles deposited therein. Examples of a metal for the metal thin film layer include, for example, at least one metal selected from Ni, Cu, Ag, Au, and the like; or an alloy including the metal. A plurality of metal thin film layers having different components may be provided.

The plating layer defining and functioning as an underlying electrode is directly provided on multilayer body 10, and is directly connected to the inner electrode layers. For the plating layer, it is possible to use, for example, at least one metal selected from Cu, Ni, Sn, Au, Ag, Pd, Zn, and the like, or an alloy including the metal. For example, when Ni is used as the metal for inner electrode layer 12, Cu, which has excellent bondability with respect to inner electrode layers 12, is preferably used as the plating layer.

Examples of a metal for the plating layer disposed on the underlying electrode layer include, at least one metal selected from Ni, Cu, Ag, Au, Sn, and the like; and an alloy including the metal. A plurality of plating layers having different components may be formed. Preferably, two plating layers, for example, a Ni plating layer and a Sn plating layer are provided.

The Ni plating layer is disposed on the underlying electrode layer and prevents the underlying electrode layer from being eroded by a solder when mounting the multilayer electronic component. The Sn plating layer is disposed on the Ni plating layer. The Sn plating layer has excellent wettability with respect to a solder including Sn. Accordingly, mountability can be improved when mounting the multilayer electronic component. It should be noted that these plating layers may not be provided.

Cl Concentration in Electrode Facing Portion

First, attention was paid to the Cl concentration of electrode facing portion 13 in multilayer body 10 after calcination. In multilayer ceramic capacitor 100, a Cl concentration $C_1$ in the entire electrode facing portion 13 is preferably about 10 wtppm≤$C_1$≤about 50 wtppm, for example. The following describes a reason for defining a range of Cl concentration $C_1$ in the entire electrode facing portion 13 with reference to FIG. 2, FIG. 3, Table 1, and Table 2.

An inspection performed to define the above-described Cl concentration will be described. First, an inspection was performed with attention being paid to IR. Various multilayer bodies having different Cl concentrations were produced as indicated as samples A to J in Table 1. For each of samples A to J, 100 test specimens were prepared. Each of samples A to J had a rectangular or substantially rectangular parallelepiped shape. Each of samples A to J had a thickness of about 1.55 mm in the lamination direction. Each of samples A to J had a length of about 3.10 mm, the length being orthogonal or substantially orthogonal to the lamination direction. Each of samples A to J had a width of about 1.55 mm, the width being orthogonal or substantially orthogonal to the lamination direction and the length direction. The outer dimension of each sample was determined as an average value of measured values of ten test specimens.

Moreover, an average thickness ta of each of the dielectric layers was about 7.5 μm. Average thickness ta of the dielectric layer can be measured as follows. First, in order to expose a cross section (surface shown in FIG. 1A) defined by the width and thickness of the multilayer body, polishing was performed up to a depth of about ½ thereof in the length direction. In order to eliminate elongation of the inner electrode layer caused by the polishing, the cross section was processed by ion milling.

In the obtained, polished multilayer body, an imaginary line was assumed to be orthogonal or substantially orthogonal to the inner electrode layer in the vicinity of the central portion of the cross section in the width direction (see FIG. 4 below). Then, a region having the dielectric layers and the inner electrode layers laminated therein to obtain a capacitance of the polished body was equally divided in the lamination direction along the imaginary line into an upper region, a central region, and a lower region.

Average thickness ta of the dielectric layer is determined by performing image analysis of an image observed by a scanning electron microscope (hereinafter, also abbreviated as "SEM") at the central portion of each region on the imaginary line. It should be noted that in each of the regions, the measurement of the thickness was performed to exclude a portion in which two or more dielectric layers are observed to be connected to each other due to an absence of the outermost dielectric layer and the inner electrode layer. Average thickness to of dielectric layer 11 can be obtained as the arithmetic mean of thicknesses at a plurality of locations (more than or equal to ten locations) in the dielectric layer.

The outer layer portion of the multilayer body was removed by polishing, thus obtaining the electrode facing portion from each multilayer body. It should be noted that when an interface between the outer layer portion and the electrode facing portion is not flat, a portion of the electrode facing portion may be removed by polishing so as to securely remove the outer layer portion. Moreover, the outer layer portion may be removed by a method other than polishing. For example, the outer layer portion may be detached electrochemically or physically.

Then, the Cl concentration of the sample, which was obtained by pulverizing the obtained electrode facing portion, was measured by combustion ion chromatography (hereinafter, also referred to as "combustion IC"). The combustion IC is a method in which a sample is burned in a heating furnace to gasify a target component included in the sample, the gasified target component is collected in absorption liquid, and separation and quantification are performed by IC. In this inspection, the burning temperature was set to about 1100° C., the carrier gas was Ar, and Cl was detected by measuring electrical conductivity (suppressor method) of the absorption liquid. The Cl concentration of each sample was determined as an average value of measured values of three test specimens.

Moreover, outer electrodes were provided on samples A to J, thus producing multilayer ceramic capacitors including various multilayer bodies having different Cl concentrations. It should be noted that each of the outer electrodes was formed by baking the paste including the metal powder and the glass powder. For each of these multilayer ceramic capacitors, a high-temperature IR was measured by applying a DC voltage of about 100 V for about 120 seconds at about 150° C. The high-temperature IR was determined as an average value of measured values of ten test specimens. Results of measurements of high-temperature IRs are shown in Table 1 together with the Cl concentrations.

Figure 2:
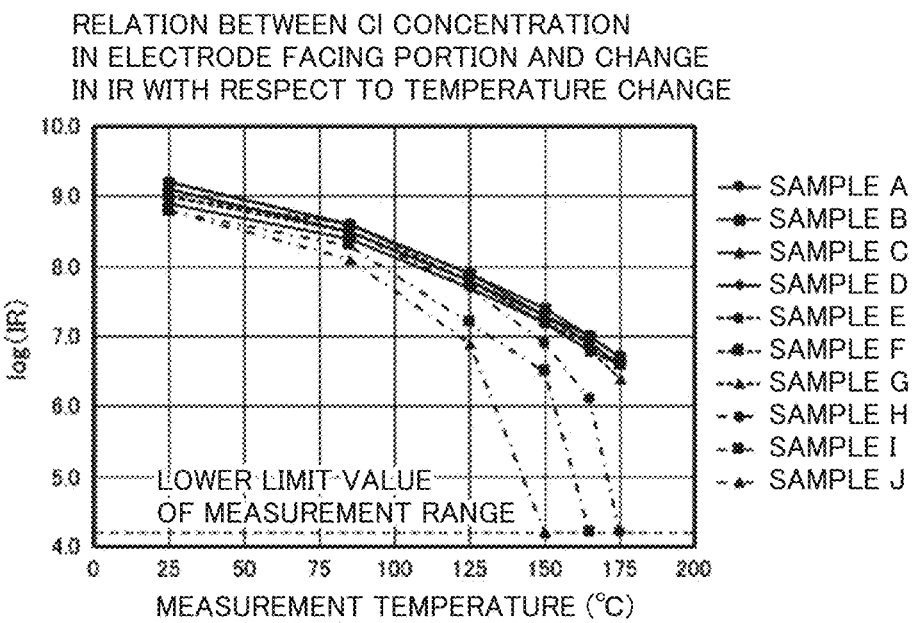
FIG. 2 is a graph showing a relationship between a Cl concentration in an electrode facing portion 13 and a change in insulation resistance (hereinafter, also referred to as "IR") with respect to a temperature change.

A change in IR with respect to a temperature change was inspected by applying a DC voltage of about 100 V for about 120 seconds at about 25° C., about 85° C., about 125° C., about 150° C., about 165° C., and about 175° C. Each of the IR values was determined as an average value of measured values of ten test specimens. Results thereof are shown in FIG. 2. The vertical axis of FIG. 2 represents an IR (log (IR)) indicated in logarithm, and the horizontal axis of FIG. 2 represents a measurement temperature. It should be noted that a protective resistor of about 13 kΩ is attached to an IR measurement device to protect a measurement circuit. Thus, a log (IR) of less than or equal to about 4.2 indicates that the IR is less than or equal to the lower limit value of the measurement range.

TABLE 1

Relation between Cl Concentration of Electrode Facing Portion and High-Temperature IR

| Sample | Cl Concentration in Electrode Facing Portion (wtppm) | Log (IR) at 150° C. |
|---|---|---|
| A | 10 | 7.3 |
| B | 16 | 7.4 |
| C | 35 | 7.3 |
| D | 37 | 7.2 |
| E | 40 | 7.3 |
| F | 47 | 7.2 |
| G | 55 | 7.2 |
| H | 60 | 6.9 |
| I | 63 | 6.5 |
| J | 73 | Less Than or Equal To 4.2 |

From the results shown in Table 1 and FIG. 2, it is understood that when the Cl concentration in the entire electrode facing portion is more than or equal to about 10 wtppm and less than or equal to about 55 wtppm, a multilayer ceramic capacitor is obtained which exhibits a high high-temperature IR and an excellent IR temperature characteristic. That is, when the Cl concentration in the entire electrode facing portion falls within the above-described range, a log (IR) at about 150° C. becomes more than or equal to about 7 in the multilayer ceramic capacitor shaped for the test. Moreover, an abrupt decrease of IR is reduced or prevented in a range up to about 175° C.

Next, an inspection was performed with attention being paid to the high-temperature load life. Various multilayer bodies having different Cl concentrations were produced as samples K to R as indicated in Table 2. For each of samples K to R, 100 test specimens were prepared. Each of samples K to R had a rectangular or substantially rectangular parallelepiped shape. Each of samples K to R had a thickness of about 1.55 mm in the lamination direction. Each of samples K to R had a length of about 3.10 mm, the length being orthogonal or substantially orthogonal to the lamination direction. Each of samples K to R had a width of about 1.55 mm, the width being orthogonal or substantially orthogonal to the lamination direction and the length direction. The outer dimension of each sample was determined as an average value of measured values of ten test specimens. Moreover, average thickness to of the dielectric layer was about 7.5 μm.

The outer layer portion of the multilayer body was removed by polishing, thus obtaining the electrode facing portion from each multilayer body. It should be noted that as described above, when an interface between the outer layer portion and the electrode facing portion is not flat, a portion of the electrode facing portion may be removed by polishing so as to securely remove the outer layer portion. Moreover, the outer layer portion may be removed by a method other than polishing. Then, the Cl concentration in the electrode facing portion was measured by combustion IC. The Cl concentration of each sample was determined as an average value of measured values of three test specimens.

Moreover, outer electrodes were provided on samples K to R, thus producing multilayer ceramic capacitors including various multilayer bodies having different Cl concentrations. It should be noted that each of the outer electrodes was formed by baking the paste including the metal powder and the glass powder. For each of these multilayer ceramic capacitors, a high-temperature IR was measured by applying a DC voltage of about 100 V for about 120 seconds at about 150° C. The high-temperature IR was determined as an average value of measured values of ten test specimens.

Each of the multilayer ceramic capacitors associated with these samples K to R was subjected to a high-temperature load test in which a DC voltage of about 150V was applied at a temperature of about 190° C. Changes in resistance values thereof over time were measured. For each sample, ten test specimens were used. Moreover, an electric field applied to the dielectric layer had an intensity of about 25 kV/mm. Here, it was determined that a short circuit occurs when the resistance value became less than or equal to about 100 kΩ.

Figure 3:
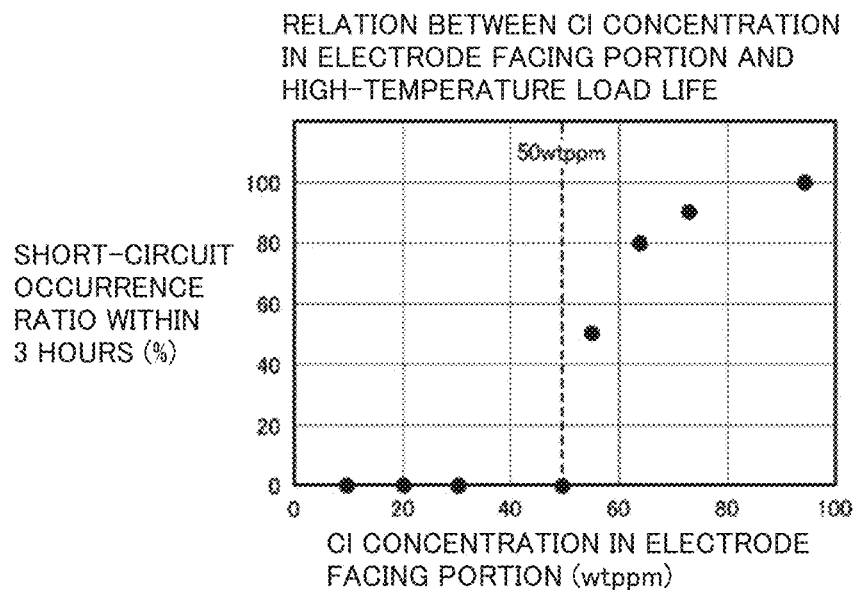
FIG. 3 is a graph showing a relationship between the Cl concentration in electrode facing portion 13 and a high-temperature load life.

Among the ten multilayer ceramic capacitors for the test, the number of multilayer ceramic capacitors short-circuited within about 3 hours was counted, thus determining a short-circuit occurrence ratio within about 3 hours. Results thereof are shown in FIG. 3. The vertical axis of FIG. 3 represents the short-circuit occurrence ratio within about 3 hours, and the horizontal axis of FIG. 3 represents the Cl concentration in each of the multilayer bodies of the multilayer ceramic capacitors for the test. Results of measurements of the high-temperature IRs and the short-circuit occurrence ratios within about 3 hours in the high-temperature load test are shown in Table 2 together with the Cl concentrations.

TABLE 2

Relation Between Cl Concentration of Electrode Facing Portion and High-Temperature Load Life

| Sample | Cl Concentration in Electrode Facing Portion (wtppm) | Log (IR) at 150° C. | Short-Circuit Occurrence Ratio within 3 Hours After Start of High-Temperature Load Test |
|---|---|---|---|
| K | 10 | 7.3 | 0/10 |
| L | 20 | 7.4 | 0/10 |
| M | 31 | 7.3 | 0/10 |
| N | 50 | 7.2 | 0/10 |
| O | 55 | 7.2 | 5/10 |
| P | 64 | 6.5 | 8/10 |
| Q | 73 | Less Than or Equal to 4.2 | 9/10 |
| R | 95 | Less Than or Equal to 4.2 | 10/10 |

From the results shown in Table 2 and FIG. 3, it is understood that when the Cl concentration of the entire electrode facing portion is more than or equal to about 10 wtppm and less than or equal to about 50 wtppm, a multilayer ceramic capacitor exhibiting a high high-temperature IR and high reliability is obtained. That is, when the Cl concentration in the entire electrode facing portion falls within the above-described range, a log (IR) at about 150° C. becomes more than or equal to about 7 in the multilayer ceramic capacitor shaped for the test. Moreover, short circuit does not occur in a short period of time in the high-temperature load test, and a sufficiently long high-temperature load life is obtained.

From the results of the high-temperature IRs, the IR temperature characteristic, and the high-temperature load life, in multilayer ceramic capacitor 100 according to the present preferred embodiment, Cl concentration $C_1$ in the entire electrode facing portion 13 preferably satisfies about 10 wtppm≤$C_1$≤about 50 wtppm.

Cl Concentration Distribution in Electrode Facing Portion

Next, attention was paid to a Cl concentration distribution in electrode facing portion 13 of multilayer body 10 after calcination. The Cl concentration distribution in electrode facing portion 13 will be described with reference to FIG. 4. FIG. 4 is a cross sectional view of the central portion of each sample in the length direction, the sample being prepared to inspect the Cl concentration distribution in electrode facing portion 13.

In defining the Cl concentration distribution, an imaginary central axis line OL of electrode facing portion 13 when seen in a plan view in the lamination direction of multilayer body is referenced. That is, when multilayer body 10 has a rectangular or substantially rectangular parallelepiped shape, central axis line OL is parallel or substantially parallel to the normal direction of first main surface 14a and the normal direction of second main surface 14b of multilayer body 10, and passes through the center of the plan view of electrode facing portion 13 when seen in each of those normal directions.

Here, it is assumed that the plurality of first and second inner electrode layers 12a, 12b are laminated without positional deviation. The center of the plan view when multilayer body 10 is seen in the normal direction of first main surface 14a is regarded as the center of the plan view of electrode facing portion 13. In this case, imaginary central axis line OL passes through the center of the plan view of first main surface 14a of multilayer body 10. It should be noted that the center of the plan view refers to the center of gravity of the plan view.

On central axis line OL, Cl concentration $C_2$ in the central portion of electrode facing portion 13 and Cl concentration $C_3$ in the both end portions of electrode facing portion 13 preferably satisfy, for example, about $0.5C_2 \leq C_3 < C_2$.

Figure 4:
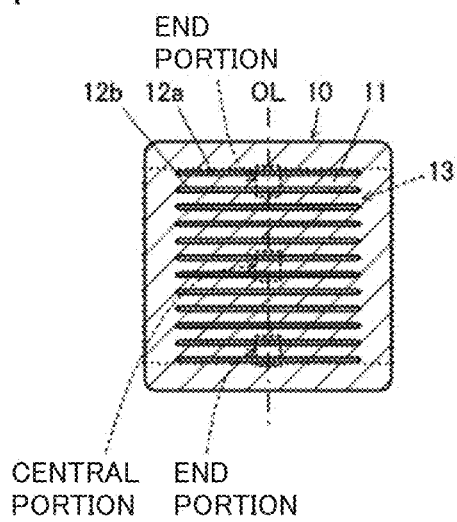
FIG. 4 is a cross sectional view of a central portion of each sample in the length direction, the sample being prepared to inspect a Cl concentration distribution in electrode facing portion 13.

Here, the central portion of electrode facing portion 13 on central axis line OL refers to a predetermined portion through which central axis line OL passes in the vicinity of the center of electrode facing portion 13 when seen in the lamination direction as shown in FIG. 4. This predetermined portion refers to a required volume when performing an element analysis in accordance with a below-described dynamic secondary ion mass spectrometry (hereinafter, also referred to as "D-SIMS"). It should be noted that in FIG. 4, this predetermined portion is set to extend over the plurality of dielectric layers 11 and inner electrode layers 12. However, this predetermined portion may be set to be within one dielectric layer 11 depending on the thickness of dielectric layer 11.

Moreover, both end portions of electrode facing portion 13 on central axis line OL refer to predetermined portions through which central axis line OL passes in the vicinities of the both ends of electrode facing portion 13 when seen in the lamination direction as shown in FIG. 4. Each of the predetermined portions can be defined in the same or similar manner as that in the case of the central portion of electrode facing portion 13 on central axis line OL. The Cl concentration in both end portions is represented by an average value of the Cl concentration in one end portion and the Cl concentration in the other end portion.

The following describes a reason to define the Cl concentration distribution in electrode facing portion 13 with reference to FIG. 4 to FIG. 8 and Table 3.

In order to define the Cl concentration distribution, a relationship between the high-temperature load life and a high-temperature IR decreased portion was inspected. Results thereof will be described. As samples for the inspection, samples K, N, and Q shown in Table 2 were used. Each of samples K and N is not short-circuited in a short period of time and has a sufficiently long high-temperature load life. On the other hand, sample Q is short-circuited within about 3 hours.

For each of samples K, N, and Q, three test specimens are provided with outer electrodes as shown in FIGS. 5A and 5, and FIGS. 6A and 6B, thus producing multilayer ceramic capacitors. It should be noted that although the multilayer ceramic capacitor based on sample Q is not a multilayer ceramic capacitor according to a preferred embodiment of the present invention as described below, subsequent explanation will be provided with reference to FIGS. 5A, 5B and FIGS. 6, and 6B. Moreover, for ease of description, a result of measurement of IR is described as log (IR) in sample N or the like, for example.

Figure 5A:
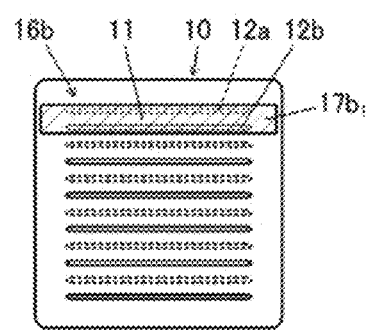
FIG. 5A is a front view showing a second end surface 16b of a multilayer ceramic capacitor that is prepared to inspect a relationship between a high-temperature load life and a high-temperature IR decreased portion and that includes a multilayer body 10 including outer electrode provided on only both end surfaces.
Figure 5B:
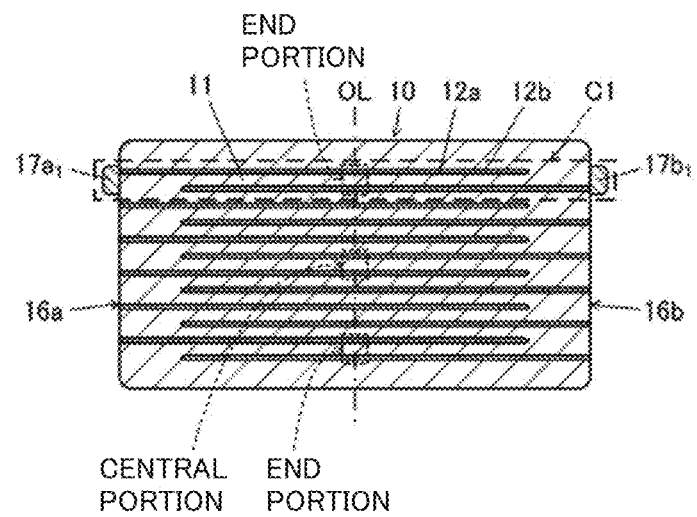
FIG. 5B is a cross sectional view of a central portion of the sample in the width direction.

FIG. 5A is a front view showing second end surface 16*b* of the multilayer ceramic capacitor in which outer electrodes are provided only at one end portion of both end surfaces of multilayer body 10. FIG. 5B is a cross sectional view of the central portion of the sample in the width direction. That is, in the multilayer ceramic capacitor shown in FIGS. 5A and 5B, the IR of the one end portion of electrode facing portion 13 when seen in the direction in which central axis line OL extends can be measured.

The measurement of the IR of the other end portion of electrode facing portion 13 on central axis line OL can be performed in the same or similar manner as described above, and therefore will not be described repeatedly. The IR of dielectric layer 11 located at both end portions is represented by an average value of the IR of dielectric layer 11 located at the one end portion and the IR of dielectric layer 11 located at the other end portion.

Figure 6A:
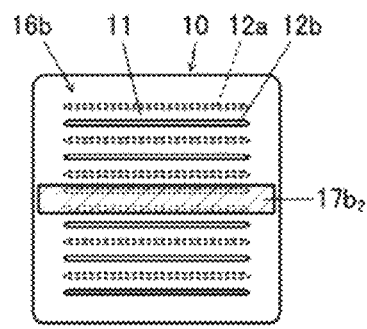
FIG. 6A is a front view showing a second end surface 16b of a multilayer ceramic capacitor that is prepared to inspect a relationship between a high-temperature load life and a high-temperature IR decreased portion and that includes a multilayer body 10 including outer electrodes provided on only both end surfaces.
Figure 6B:
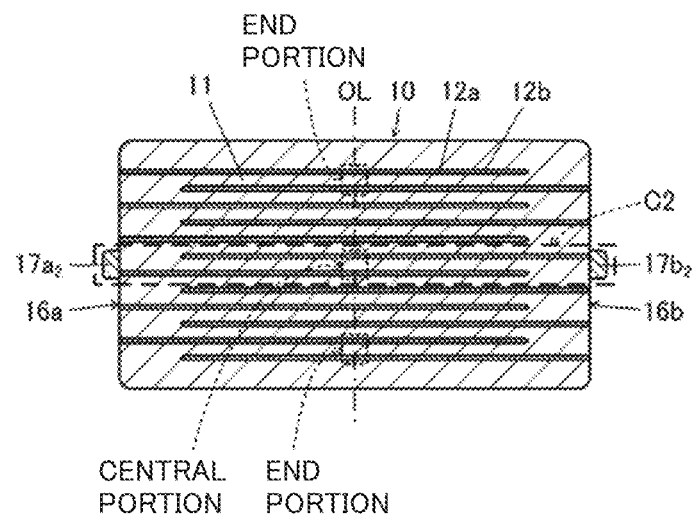
FIG. 6B is a cross sectional view of a central portion of the sample in the width direction.

FIG. 6A is a front view showing second end surface 16*b* of the multilayer ceramic capacitor in which outer electrodes are provided only at the central portion of both end surfaces of multilayer body 10. FIG. 6B is a cross sectional view of the central portion of the sample in the width direction. That is, in the multilayer ceramic capacitor shown in FIGS. 6A and 6B, the IR of dielectric layer 11 located at the central portion of electrode facing portion 13 when seen in the direction in which central axis line OL extends can be measured.

Figure 7:
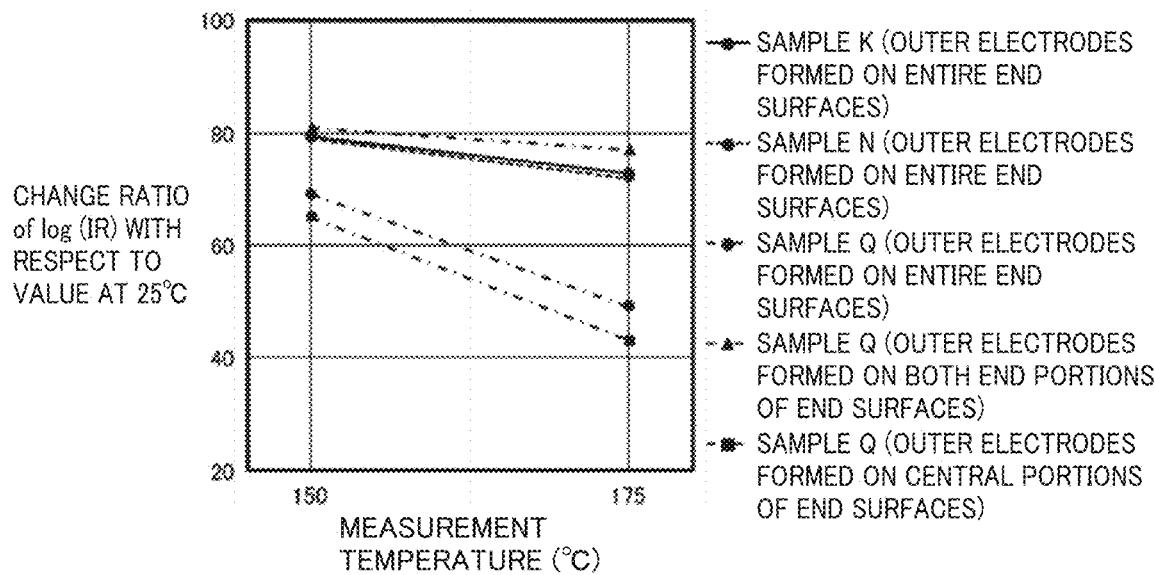
FIG. 7 is a graph showing a relationship between the high-temperature IR decreased portion in electrode facing portion 13 and the high-temperature load life.

FIG. 7 is a graph showing a relationship between the high-temperature IR decreased portion in electrode facing portion 13 and the high-temperature load life based on the results of measurements of the high-temperature IRs of dielectric layers 11 and the entire electrode facing portion 13 at both end portions and central portion of electrode facing portion 13 on central axis line OL. The measurements of the high-temperature IRs were performed under the same voltage application condition as that when measuring the high-temperature IRs for samples A to J.

With reference to FIG. 7, for example, in each of samples K and N, the log (IR) of the entire electrode facing portion 13 at about 175° C. is maintained at a value of more than or equal to about 70% with respect to the log (IR) thereof at a room temperature. Each of samples K and N is not short-circuited in a short period of time in the high-temperature load test and has a sufficiently long high-temperature load life. On the other hand, in sample Q, the log (IR) of the entire electrode facing portion 13 at about 175° C. is decreased to about 50% with respect to the log (IR) thereof at the room temperature. Sample Q is short-circuited within about 3 hours in the high-temperature load test.

However, in sample Q, the log (IR) in both ends of electrode facing portion 13 is maintained to have a value of more than or equal to about 70% with respect to the log (IR) therein at the room temperature. It is presumed that this value is at a level comparable to that of a value measured if the log (IR) in both end portions of electrode facing portion 13 is measured in each of samples K and N. On the other hand, in sample Q, the log (IR) in the central portion of electrode facing portion 13 is decreased to about 40% with respect to the log (IR) therein at the room temperature. That is, it is presumed that the high-temperature IR decreased portion within electrode facing portion 13 in sample Q is located in the central portion of electrode facing portion 13 and in the vicinity of the central portion.

Figure 8:
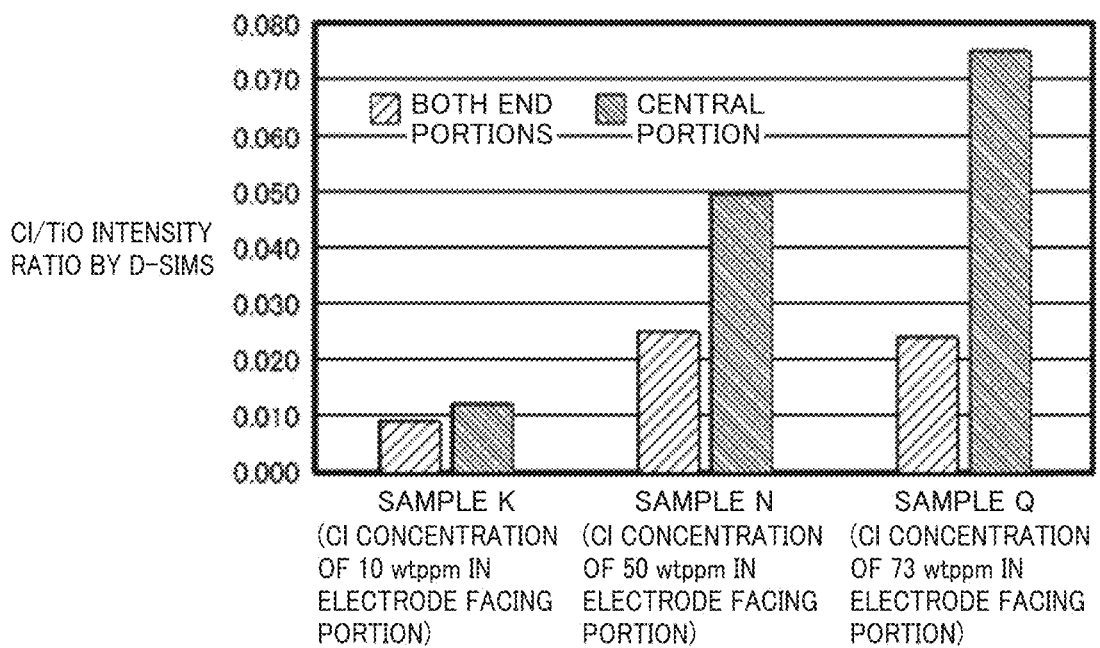
FIG. 8 is a graph showing a relationship between a Cl concentration distribution in electrode facing portion 13 and the high-temperature load life.

In view of the above, the result of inspecting the Cl concentration distribution of electrode facing portion 13 in multilayer body 10 after calcination will be described with reference to FIG. 4, FIG. 8, and Table 3. Explanation for FIG. 4 has been described above, and will not be repeated. For each of samples K, N, and Q, polishing is performed to about ½ thereof in the length direction so as to expose the cross section (plane shown in FIG. 4) defined by the width and thickness. In order to eliminate elongation of inner electrode layer 12 caused by the polishing, the cross section was processed by ion milling.

For each of obtained, polished samples K, N, and Q, imaginary central axis line OL orthogonal or substantially orthogonal to inner electrode layers 12 is referenced in the vicinity of the central portion of the above-described cross section in the width direction. On that central axis line OL, Cl concentration $C_2$ in the central portion of electrode facing portion 13 and Cl concentration $C_3$ in the both portions of electrode facing portion 13 were measured by D-SIMS. It should be noted that Cl concentration $C_3$ in both end portions of electrode facing portion 13 was determined as an average value of a measured Cl concentration in one end portion and a measured Cl concentration in the other end portion.

As described above, FIG. 4 shows that the measurement by D-SIMS is performed to extend over the plurality of dielectric layers 11 and inner electrode layers 12. That is, each of these Cl concentrations can be considered as a Cl concentration in a region including the plurality of dielectric layers 11 and inner electrode layers 12. However, the measurement by the D-SIMS may be performed in one dielectric layer 11 depending on the thickness of dielectric layer 11.

The D-SIMS is a method for performing an element analysis in which, by continuously irradiating a sample with a chemically active primary ion beam, an element of the sample is pushed out as secondary ions and the mass of those secondary ions is analyzed. It should be noted that in this analysis, a value (hereinafter, also referred to as "Cl/TiO") obtained by normalizing a detected amount of Cl that is the element targeted for the analysis with a detected amount of TiO that is a basic component in dielectric layer 11 was evaluated as the Cl concentration in each analyzed portion.

Table 3 shows a relationship between the Cl concentration distribution and the high-temperature load life within electrode facing portion 13 in each sample as measured as described above. Moreover, FIG. 8 is a graph showing a relation between the Cl concentration distribution in electrode facing portion 13 and the high-temperature load life.

TABLE 3

Relation between Cl Concentration Distribution in Electrode
Facing Portion and High-Temperature Load Life

| | Cl/TiO Intensity Ratio by D-SIMS | | |
|---|---|---|---|
| | Sample K (Cl Concentration of 10 wtppm in Electrode Facing Portion) | Sample N (Cl Concentration of 50 wtppm in Electrode Facing Portion) | Sample Q (Cl Concentration of 73 wtppm in Electrode Facing Portion) |
| One End Portion | 0.008 | 0.024 | 0.024 |
| Other End Portion | 0.009 | 0.026 | 0.023 |
| Both End Portions | 0.008 | 0.025 | 0.024 |
| Central Portion | 0.012 | 0.050 | 0.075 |

From the results shown in Table 2 and FIG. 3, it is understood that in each of samples K and N that each have a sufficiently long high-temperature load life when a multilayer ceramic capacitor is formed, Cl concentration $C_2$ in the central portion and Cl concentration $C_3$ in the both end portions satisfy about $0.5C_2 \leq C_3 < C_2$. When Cl concentration $C_2$ in the central portion is twice or more as large as Cl concentration $C_3$ in the both end portions as in sample Q, short circuit is likely to occur in a short period of time in the high-temperature load test although a mechanism thereof is not clarified.

Therefore, in multilayer ceramic capacitor 100 according to the present preferred embodiment, for example, Cl concentration $C_1$ preferably satisfies about 10 wtppm$\leq C_1 \leq$about 50 wtppm and Cl concentration $C_2$ and Cl concentration $C_3$ preferably satisfy about $0.5C_2 \leq C_3 < C_2$. In that case, a sufficiently long high-temperature load life, i.e., high reliability, can be obtained.

In multilayer ceramic capacitor 100 according to the present preferred embodiment, when average thickness ta of each dielectric layer satisfies about 1 μm$\leq$ta$\leq$about 10 μm, for example, the advantageous effect of improving reliability can be more significantly obtained by the uniform Cl concentration distribution.

Method for Manufacturing Multilayer Electronic Component

A method for manufacturing multilayer ceramic capacitor 100 as an example of a multilayer electronic component according to a preferred embodiment of the present invention will be described in order of manufacturing steps. The method for manufacturing multilayer ceramic capacitor 100 includes the following steps. It should be noted that reference characters used below correspond to those shown in FIGS. 1A and 1B.

The method for manufacturing multilayer ceramic capacitor 100 includes a step of obtaining a plurality of ceramic green sheets using dielectric powder (dielectric raw material powder) including Ba, Ti and Cl, for example. It should be noted that the word "green" is an expression indicating "pre-sintering", which will be described below. That is, each of the ceramic green sheets corresponds to a pre-sintering dielectric layer. Each of the ceramic green sheets includes a binder component in addition to the dielectric raw material powder. The binder component is not particularly limited.

The dielectric raw material powder may include various additives, each of which is, for example, a compound of Si, Re, M and the like added as required. Re is preferably at least one element selected from La, Ce, Pr, Nd, Sm, Eu, Gd, Tb, Dy, Ho, Er, Tm, Yb, Lu, and Y, for example. M is at least one element selected from Mn, Ni, Co, Fe, Cr, Cu, Mg, Li, Al, Mo, W, and V. However, the various additives, which are compounds of Si, Re, M, and the like, may not be included.

The dielectric raw material powder can be prepared by, for example, providing organic compounds defining and functioning as the additives onto the surfaces of the $BaTiO_3$ powder and performing calcination to burn organic components so as to obtain such a state that the additives are provided on the surfaces of the $BaTiO_3$ powder in the form of oxides. However, it is not limited thereto. The additives may be provided in the form of organic compounds or in the mixture of oxides and organic compounds.

The $BaTiO_3$ powder can be obtained by, for example, the solid phase synthesis method, the hydrothermal synthesis method, the oxalic acid method, or the like as described above. It should be noted that $BaTiO_3$ solid solution powder in which Ca or the like substitutes for portions of Ba may be used. The $BaTiO_3$ powder includes Cl originating from the raw material.

The method for manufacturing multilayer ceramic capacitor 100 includes a step of forming inner electrode layer patterns on ceramic green sheets by printing an inner electrode layer paste, for example. The inner electrode layer pattern corresponds to a pre-sintering inner electrode layer. The inner electrode layer paste preferably includes, for example, metal powder including one of Ni, a Ni alloy, Cu, and a Cu alloy, powder (coexisting material) obtained by applying the various additives onto the surfaces of the $BaTiO_3$ powder, and a binder component. The binder component is not limited particularly. It should be noted that the coexisting material may not be included.

The above-described coexisting material can be prepared by, for example, providing organic compounds defining and functioning as the additives onto the surfaces of the $BaTiO_3$ powder and performing calcination to burn organic components so as to obtain such a state that the additives are provided on the surfaces of the $BaTiO_3$ powder in the form of oxides. However, it is not limited thereto. The additives may be provided in the form of organic compounds or in the mixed form of oxides and organic compounds, for example. Moreover, for example, $BaTiO_3$ solid solution powder may be used instead of the $BaTiO_3$ powder. The coexisting material may be the same as or different from the dielectric raw material powder. It should be noted that the inner electrode layer pattern may be formed by a method other than the printing of the above-described inner electrode layer paste.

The method for manufacturing multilayer ceramic capacitor 100 includes a step of obtaining a green multilayer body by laminating a plurality of ceramic green sheets including the ceramic green sheet having the inner electrode pattern formed thereon. The green multilayer body corresponds to a pre-sintering multilayer body.

The method for manufacturing multilayer ceramic capacitor 100 includes a step of obtaining multilayer body 10 including the plurality of laminated dielectric layers 11 and the plurality of inner electrode layers 12 by sintering the green multilayer body at a first temperature. The first temperature is a maximum temperature during calcination.

Figure 9A:
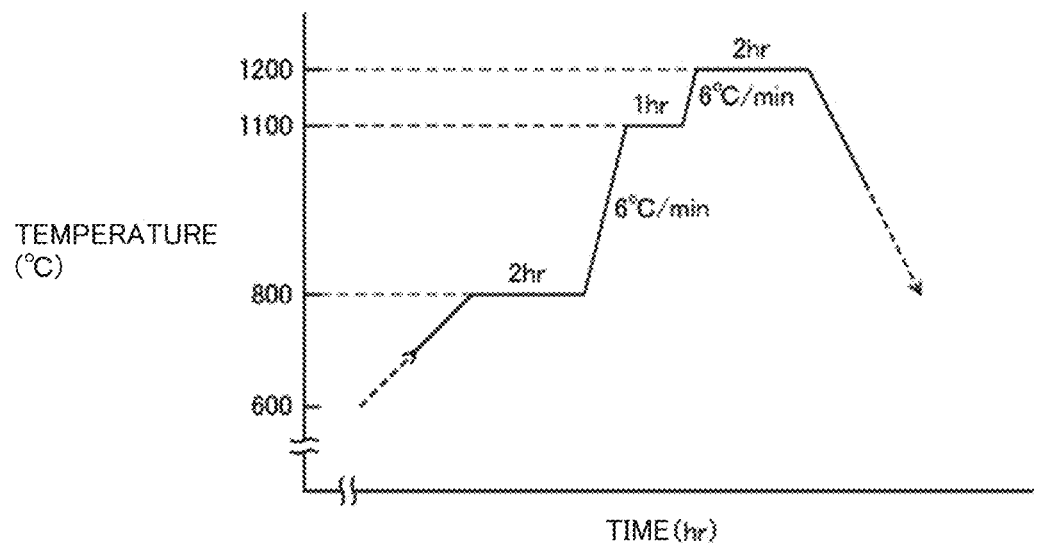
FIG. 9A shows an exemplary temperature profile in a calcination atmosphere in a step of obtaining multilayer body 10 by sintering a pre-sintering multilayer body in a method for manufacturing the multilayer electronic component according to a preferred embodiment of the present invention.
Figure 9B:
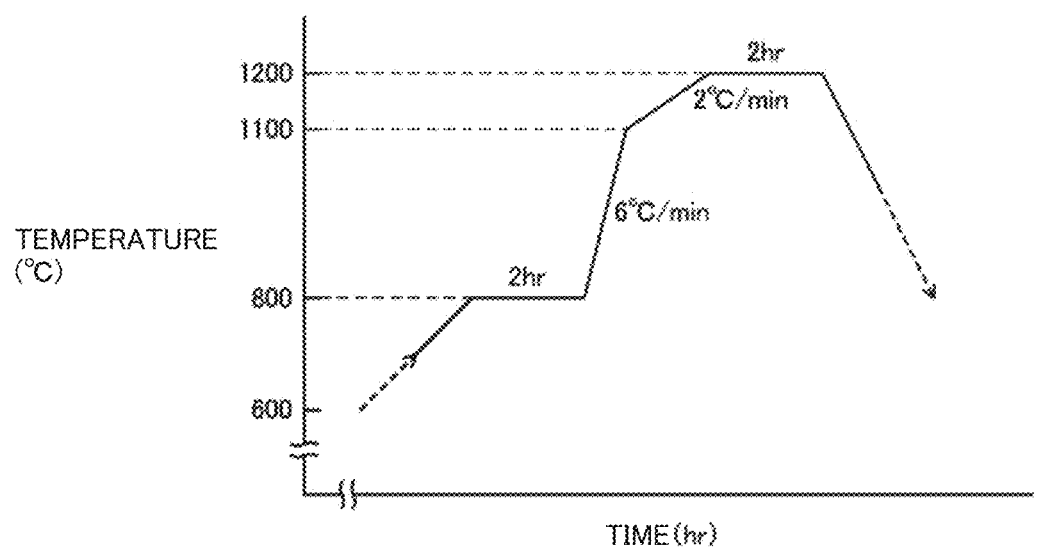
FIG. 9B shows another exemplary temperature profile in the calcination atmosphere.

The step of obtaining multilayer body 10 includes at least one of a holding step in which a holding temperature and a holding time are defined, and a temperature increasing step in which a temperature increasing rate is defined. FIGS. 9A and 9B respectively show an exemplary temperature profile and another exemplary temperature profile in a calcination atmosphere in the step of obtaining multilayer body 10 by sintering the pre-sintering multilayer body in the method for manufacturing the multilayer electronic component according to the present invention.

FIG. 9A shows an example in which a holding step of holding at about 1100° C. for about 1 hour is included in the temperature profile of the calcination atmosphere. It should be noted that a step of holding at about 800° C. for about 2 hours is a step of removing a residue of remaining binder component after a binder removing step performed in advance prior to the step of sintering the green multilayer body. In the present preferred embodiment, this step is not a necessary step. A temperature increasing rate in each stage is about 6° C./minute. On the other hand, FIG. 9B shows another example in which a temperature increasing rate from about 1100° C. to about 1200° C. is set to about 2° C./minute, which is less than or equal to about half of about 6° C./minute that is the temperature increasing rate from about 800° C. to about 1100° C.

In the example, the holding time is about 1 hour, the first temperature is about 1200° C., the second temperature is about 1100° C. that is lower than the first temperature by about 100° C., and the third temperature is about 800° C. that is lower than the second temperature by about 300° C. However, the holding time may be more than or equal to about 0.5 hour, for example. Moreover, the second temperature may be a temperature lower than the first temperature by about 50° C. to about 250° C., for example. Further, the third temperature may be a temperature lower than the second temperature by about 150° C. to about 350° C., for example.

Cl concentrations $C_1$ to $C_3$ in the multilayer body obtained by sintering the green multilayer body under the above conditions satisfy the ranges defined in preferred embodiments of the present invention. Moreover, in that case, a sufficiently long high-temperature load life, i.e., high reliability, can be obtained.

The preferred embodiments disclosed in this specification are illustrative and the present invention is not limited to the preferred embodiments described above. The scope of the present invention is defined by the terms of the claims, and is intended to include any modifications within the scope and meaning equivalent to the terms of the claims. Moreover, various applications and modifications can be made within the above-described scope.

For example, various applications and modifications can be made within the scope of the present invention with regard to the number of the dielectric layers, the material of each dielectric layer, the number of the inner electrode layers, and the material of each inner electrode layer in the multilayer body. Moreover, although the multilayer ceramic capacitor has been illustrated as an example of the multilayer electronic component, the present invention is not limited thereto, and is applicable to, for example, a capacitor element or the like formed in a multilayer substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer electronic component comprising:
   a multilayer body including a plurality of dielectric layers and a plurality of inner electrode layers, the multilayer body including an electrode facing portion in which the plurality of inner electrode layers are laminated to face each other with the plurality dielectric layers interposed therebetween, the multilayer body having a thickness of more than or equal to about 1.5 mm in a lamination direction a length orthogonal or substantially orthogonal to the lamination direction of more than or equal to about 3.0 mm, and a width orthogonal or substantially orthogonal to the lamination direction and a length direction of more than or equal to about 1.5 mm; wherein
   each of the plurality of dielectric layers includes Ba, Ti, and Cl;
   a Cl concentration $C_1$ in an entirety of the electrode facing portion satisfies about 10 wtppm≤$C_1$≤about 50 wtppm; and
   on an imaginary central axis line of the electrode facing portion when seen in a plan view in the lamination direction, a Cl concentration $C_2$ in a central portion of the electrode facing portion and a Cl concentration $C_3$ in both end portions of the electrode facing portion satisfy about $0.5C_2 \leq C_3 < C_2$.

2. The multilayer electronic component according to claim 1, wherein an average thickness ta of each of the plurality of dielectric layers satisfies about 1 μm≤ta≤10 μm.

3. The multilayer electronic component according to claim 1, wherein the multilayer electronic component is a multilayer ceramic capacitor.

4. The multilayer electronic component according to claim 1, wherein the plurality of dielectric layers include a plurality of crystal grains including a perovskite compound including $BaTiO_3$.

5. The multilayer electronic component according to claim 1, wherein the plurality of inner electrode layers include at least one of Ni, a Ni alloy, Cu, and a Cu alloy.

6. The multilayer electronic component according to claim 5, wherein the plurality of inner electrode layers further include dielectric particles.

7. The multilayer electronic component according to claim 1, wherein the multilayer body has a rectangular or substantially rectangular parallelepiped shape.

8. The multilayer electronic component according to claim 1, wherein
   the plurality of dielectric layers include a first outer layer portion, a second outer layer portion, and an inner layer portion between the first and second outer layer portions;
   the first outer layer portion is provided between a first main surface of the multilayer body and an inner electrode layer of the plurality inner electrode layers closest to the first main surface; and
   the second outer layer portion is provided between a second main surface of the multilayer body and an inner electrode layer of the plurality inner electrode layers closest to the second main surface.

9. The multilayer electronic component according to claim 1, wherein
   the plurality of inner electrode layers include a first inner electrode layer and a second inner electrode layer;
   the first inner electrode layer includes a region that faces the second inner electrode layer with a dielectric layer of the plurality of dielectric layers interposed therebetween, and a drawn region that extends to a first end surface of the multilayer body; and
   the second inner electrode layer includes a region that faces the first inner electrode layer with the dielectric layer of the plurality of dielectric layers interposed therebetween, and a drawn region that extends to a second end surface of multilayer body.

10. The multilayer electronic component according to claim 1, further comprising:

a first outer electrode provided on a first end surface of the multilayer body; and a second outer electrode provided on a second end surface of the multilayer body.

11. The multilayer electronic component according to claim 10, wherein the first outer electrode extends from the first end surface to a first main surface, a second main surface, a first side surface, and a second side surface of the multilayer body; and the second outer electrode extends from the second end surface to the first main surface, the second main surface, the first side surface, and the second side surface.

12. The multilayer electronic component according to claim 10, wherein each of the first and second outer electrodes includes an underlying electrode layer and a plating layer disposed on the underlying electrode layer.

13. The multilayer electronic component according to claim 12, wherein the underlying electrode layer includes a sintered body layer.

14. The multilayer electronic component according to claim 13, wherein the sintered body layer includes an electric conductor region and an oxide region.

15. The multilayer electronic component according to claim 12, wherein the underlying electrode layer is an electrically conductive resin layer.

16. The multilayer electronic component according to claim 15, wherein the conductive resin layer includes conductive particles and a resin portion.

17. The multilayer electronic component according to claim 16, wherein the conductive particles include at least one of Ni, Cu, and Ag, or an alloy including Ni, Cu, or Ag.

18. The multilayer electronic component according to claim 16, wherein the resin portion includes an epoxy-based thermosetting resin.

19. The multilayer electronic component according to claim 12, wherein the underlying electrode layer is a metal thin film layer.

* * * * *